(12) United States Patent
Aschauer

(10) Patent No.: US 8,850,761 B2
(45) Date of Patent: Oct. 7, 2014

(54) STRUCTURAL DESIGN WITH REAR-VENTILATED CLADDING ELEMENTS

(76) Inventor: Johann Aschauer, Bad Kreuzen (AT)

( * ) Notice: Subject to any disclaimer, the term of this patent is extended or adjusted under 35 U.S.C. 154(b) by 0 days.

(21) Appl. No.: 13/985,361

(22) PCT Filed: Feb. 8, 2012

(86) PCT No.: PCT/AT2012/050020
§ 371 (c)(1),
(2), (4) Date: Aug. 14, 2013

(87) PCT Pub. No.: WO2012/109690
PCT Pub. Date: Aug. 23, 2012

(65) Prior Publication Data
US 2013/0326972 A1 Dec. 12, 2013

(30) Foreign Application Priority Data

Feb. 16, 2011 (AT) ..................................... 205/2011

(51) Int. Cl.
| | | |
|---|---|---|
| *E04B 1/70* | (2006.01) | |
| *E04B 1/76* | (2006.01) | |
| *E04F 13/08* | (2006.01) | |
| *F24F 7/04* | (2006.01) | |
| *E04B 2/88* | (2006.01) | |
| *F24F 13/08* | (2006.01) | |
| *F24J 2/42* | (2006.01) | |
| *E04F 13/00* | (2006.01) | |
| *F24F 7/00* | (2006.01) | |

(52) U.S. Cl.
CPC ......... *E04B 1/7076* (2013.01); *F24F 2007/003* (2013.01); *E04B 2/88* (2013.01); *F24F 7/04* (2013.01); *E04B 1/7069* (2013.01); *F24F 13/08* (2013.01); *Y02B 10/20* (2013.01); *E04B 1/7612* (2013.01); *F24J 2/42* (2013.01); *E04F 13/007* (2013.01)
USPC ................ 52/209; 52/173.3; 52/235; 52/508; 52/656.6

(58) Field of Classification Search
CPC . E04F 13/077; E04F 13/007; F24F 2007/003; F24F 7/04; F24F 13/08; F24F 2221/52; E04B 2/88; E04B 1/7069; E04B 1/7076; E04B 7/10
USPC .......... 52/209, 302.1, 508, 235, 173.3, 656.5, 52/656.6
See application file for complete search history.

(56) References Cited

U.S. PATENT DOCUMENTS 3,343,323 A * 9/1967 Mayfield ...................... 52/302.3
4,237,865 A * 12/1980 Lorenz .......................... 126/599
(Continued)

FOREIGN PATENT DOCUMENTS

| DE | 39 00 031 C1 | 5/1990 |
| DE | 198 59 851 A1 | 6/2000 |

(Continued)

OTHER PUBLICATIONS

International Search Report of PCT/AT2012/050020, date of mailing Aug. 7, 2012.

*Primary Examiner* — Robert Canfield
(74) *Attorney, Agent, or Firm* — Collard & Roe, P.C.

(57) ABSTRACT

A structural design is proposed, comprising rear-ventilated cladding elements (1), in particular plates or boards, which can be hung in front of a supporting framework (2), in particular consisting of vertical support elements and horizontal bearing elements, wherein the cladding elements are each assigned a frame (3) which spans a rear-ventilation cross-section (4) and the upper and lower frame leg profiles (5, 6) of which have ventilation openings (8) leading to the front (7) of the cladding. In order to provide advantageous rear-ventilation conditions it is proposed that at least the upper frame leg profile interior (12) is assigned a splash guard (13) which is arranged in the manner of a labyrinth seal, adjoins the frame leg profile below the ventilation openings (8), covers the ventilation openings (8) and preferably faces with the free end thereof towards the front (7) of the cladding.

9 Claims, 5 Drawing Sheets

(56) References Cited

U.S. PATENT DOCUMENTS

| | | | | |
|---|---|---|---|---|
| 4,484,566 A | * | 11/1984 | Gonzalez | 126/629 |
| 7,134,247 B2 | * | 11/2006 | Ting | 52/235 |
| 7,313,891 B2 | * | 1/2008 | Showers | 52/267 |
| 7,774,998 B2 | * | 8/2010 | Aschenbrenner | 52/173.3 |
| 8,191,325 B2 | * | 6/2012 | Ting | 52/235 |
| 2007/0094965 A1 | * | 5/2007 | Mitchell | 52/302.1 |
| 2008/0134594 A1 | * | 6/2008 | Ness | 52/200 |
| 2011/0252731 A1 | * | 10/2011 | Boyer et al. | 52/302.1 |
| 2011/0277394 A1 | * | 11/2011 | Chich et al. | 52/95 |
| 2013/0291465 A1 | * | 11/2013 | Resso | 52/302.1 |

FOREIGN PATENT DOCUMENTS

| | | | |
|---|---|---|---|
| DE | 20 2007 011 819 U1 | | 1/2009 |
| DE | 10 2009 020 003 A1 | | 11/2010 |
| EP | 0 302 472 A1 | | 2/1989 |
| EP | 0 601 526 A2 | * | 6/1994 |
| JP | 2012-180689 | * | 9/2012 |
| WO | 2012/109690 | * | 8/2012 |

* cited by examiner

STRUCTURAL DESIGN WITH REAR-VENTILATED CLADDING ELEMENTS

CROSS REFERENCE TO RELATED APPLICATIONS

This application is the National Stage of PCT/AT2012/050020 filed on Feb. 8, 2012, which claims priority under 35 U.S.C. §119 of Austrian Application No. A 205/2011 filed on Feb. 16, 2011, the disclosure of which is incorporated by reference. The international application under POT article 21(2) was not published in English.

BACKGROUND OF THE INVENTION

The invention relates to a structural design with rear-ventilated cladding elements, in particular plates or boards, which can be hung in front of a supporting framework, in particular consisting of vertical support elements and horizontal bearing elements, wherein the cladding elements are each assigned one frame which spans a rear-ventilation cross-section and the upper and lower frame leg profiles of which have ventilation openings leading to the front of the cladding.

DESCRIPTION OF THE PRIOR ART

Claddings made of rear-ventilated plate-like cladding elements which are suspended in front of a building wall by means of a supporting framework are known in many embodiments, e.g. from EP 302 472 A1 and DE 10 2009 020 003 A1. The supporting framework, which is made of a lath of perpendicularly and horizontally arranged support rails extending in parallel with respect to each other, are fixed to the building wall, whereupon the plate-like cladding elements are attached to the supporting framework. The supporting framework generally consists of metal and is anchored in the brickwork. Depending on the type of the cladding elements, fixing selectively occurs in a punctiform manner by bolts, screws, clamps, clamping elements or the like. Alternatively, each cladding element can be associated with a frame which carries the cladding element and is attached to the supporting framework. Cold thermal bridges are avoided by using plastic insulators.

The punctiform fixing leads to the disadvantage in the known constructions that considerable alignment work is required for the individual cladding elements, because dimensional deviations in the prefabricated elements of the supporting constructions will add up during the mounting of the cladding elements with the unavoidable dimensional deviations in the building wall and in the supporting framework. Although the frame construction is more complex in production, the individual cladding elements can be attached with higher precision to the supporting framework, thus leading to less follow-up work. Furthermore, there are difficulties in protection from corrosion and in rear ventilation of the cladding in the known constructions.

SUMMARY OF THE INVENTION

The invention is based on the object of providing a structural design with rear-ventilated cladding elements of the kind mentioned above, which in addition to proper rear ventilation offers improved protection against the penetration of fluids into the rear-ventilation area such as driving rain, a concentrated water jet during the cleaning of the elements or the like etc. The invention is especially suitable for creating structural designs which are open to the diffusion of vapor.

This object is achieved in accordance with the invention in such a way that at least the upper frame leg profile interior is assigned a splash guard which is in the manner of a labyrinth seal, adjoins the frame leg profile below the ventilation openings, covers the ventilation openings and preferably faces with the free end thereof towards the front of the cladding. These measures provide improved protection against the penetration of fluids into the rear-ventilation area in addition to proper rear ventilation. This is ensured especially by the splash guard provided in form of a labyrinth seal, at least in the upper frame leg. The splash guard must be dimensioned in such a way that it cannot be overcome by driving rain. A concentrated water jet such as occurs during the cleaning of the elements by means of a high-pressure cleaning device for example will be broken and deflected by the splash guard arranged in the manner of a labyrinth seal in such a way that although the fluid may partly penetrate the profile through the ventilation openings, it will be prevented by the splash guard to reach the rear-ventilation area behind the cladding element and will be guided out again via ventilation openings adjoining in the longitudinal direction of the frame leg profile. The supporting framework can also be a conventional house facade which may optionally need to be repaired and to which the rear-ventilated cladding elements are fixed. A structural design which is open to the diffusion of vapor can be created in this way in a simple manner by means of the invention. If the rear-ventilated cladding elements are or comprise active or passive solar collectors, the rear ventilation will prevent overheating of the modules, in particular of especially sensitive photovoltaic cells, in a simple and secure manner.

Especially simple constructional conditions for the splash guard are obtained when it is arranged in the manner of a C-profile which is directed with its opening against the front of the facade. The dimensioning of the individual distances between the profile and the splash guard is based on the respective purpose and is decided by the person skilled in the art. Furthermore, it is recommended that the ventilation openings are set back in relation to the front of the facade by approximately the thickness of the cladding elements in order to remove energy from the fluid prior to any penetration thereof.

A splash guard can additionally or alternatively be assigned to the bottom frame leg profile interior, which splash guard adjoins the rear wall of the frame leg profile above the ventilation openings and which faces with its free end against the front of the facade. A water jet penetrating the profile via the ventilation openings will be prevented from rising into the rear-ventilation area by the splash guard and will be guided out of the profile via ventilation openings adjoining in the longitudinal direction of the frame leg profile.

Clean mounting conditions are obtained when the upper and preferably the lower frame leg profile form a receiving fold for the cladding elements, as a result of which the cladding elements are not only protected in a better way against damage but can also easily be attached to the substructure.

In this connection, the upper and lower frame leg profile can be assembled with peripheral frame leg profiles into a frame which is enclosed on the circumferential side, wherein the peripheral frame leg profiles are selectively only attached to the rear side of the cladding elements or additionally comprise a fold in which the cladding element is inserted. If the rear walls of the frame legs are additionally disposed in a common plane and if the frame is attached to a preferably gas-tight but vapor-permeable substructure, direct gas exchange between adjacent cladding elements can be avoided. Each cladding element is therefore only rear-ventilated itself and not additionally via adjacent cladding elements, which leads to an improved fire protection effect of the construction in accordance with the invention.

If insect screens which cover the ventilation channel cross-section are assigned to the upper and the lower frame leg profile in the ventilation channel opening into the rear-ventilation cross-section, it is not only possible to prevent the nesting of insects in the rear-ventilation area, but also to increase the security against the penetration of fluids into the rear-ventilation area by the screen.

The invention further relates to a cladding element for use in a structural design as explained above, comprising a frame which spans a rear-ventilation cross-section and whose upper and lower frame leg profile comprises ventilation openings opening towards the front of the cladding. A splash guard arranged in the manner of a labyrinth seal is assigned to at least the upper frame leg profile interior, which splash guard adjoins the frame leg profile beneath the ventilation openings, covers the ventilation openings and faces with its free end preferably towards the front of the cladding.

BRIEF DESCRIPTION OF THE DRAWINGS

The invention is schematically shown in the drawings by reference to an embodiment, wherein.

DETAILED DESCRIPTION OF THE PREFERRED EMBODIMENTS

Figure 1:
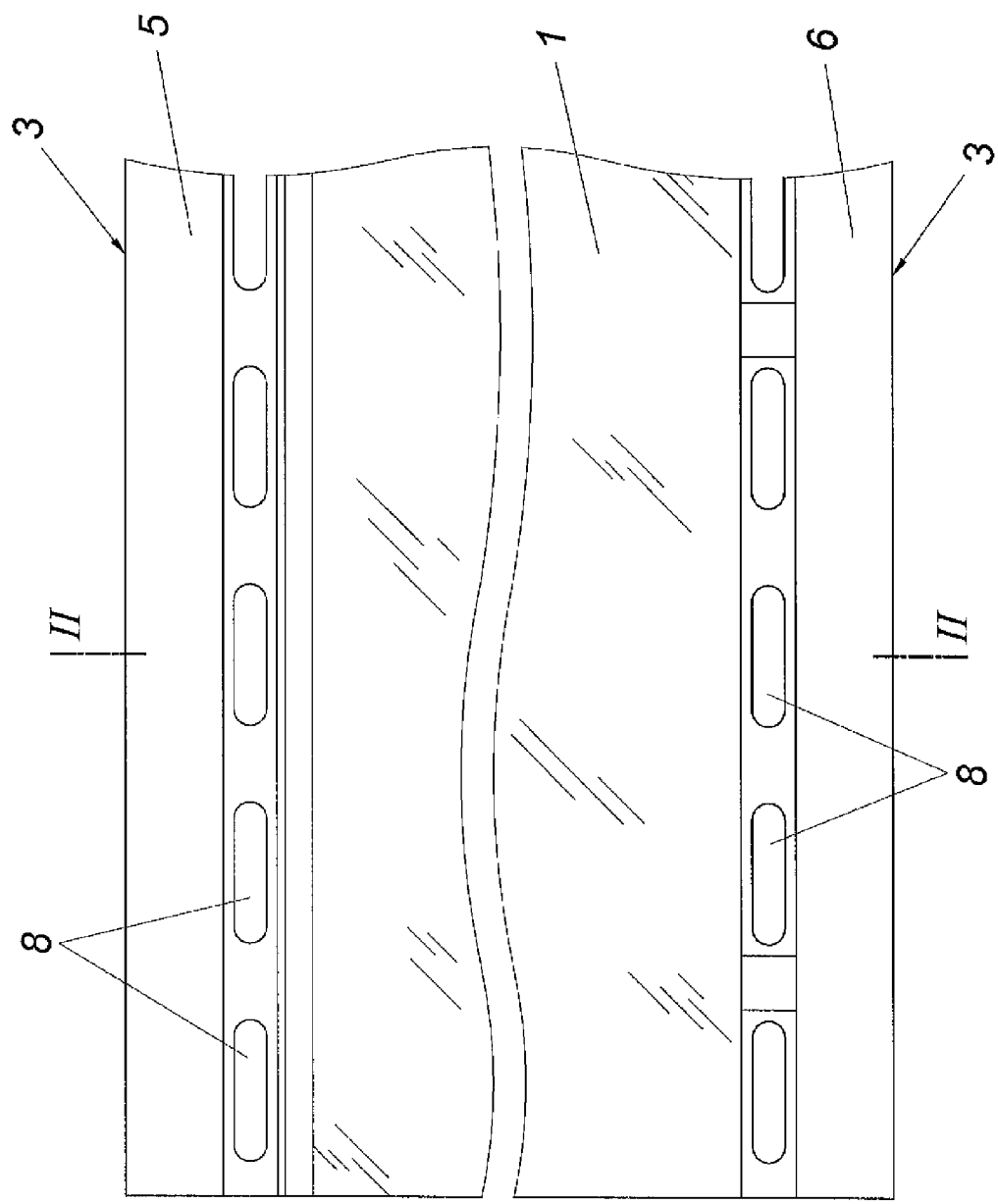
FIG. 1 shows a sectional view of a structural design in accordance with the invention in a front view.
Figure 2:
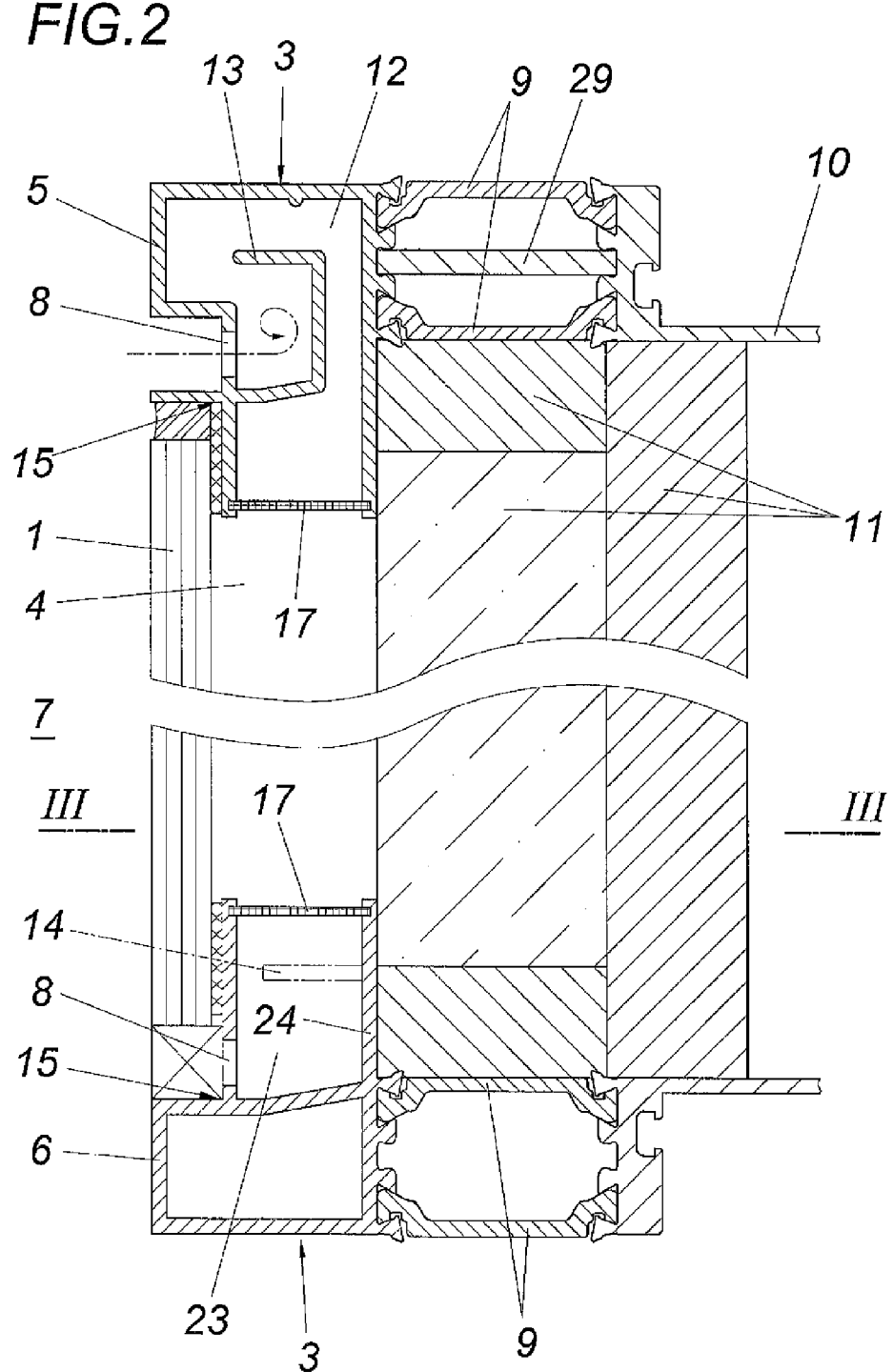
FIG. 2 shows the structural design of FIG. 1 in a sectional view along the line II-II.
Figure 3:
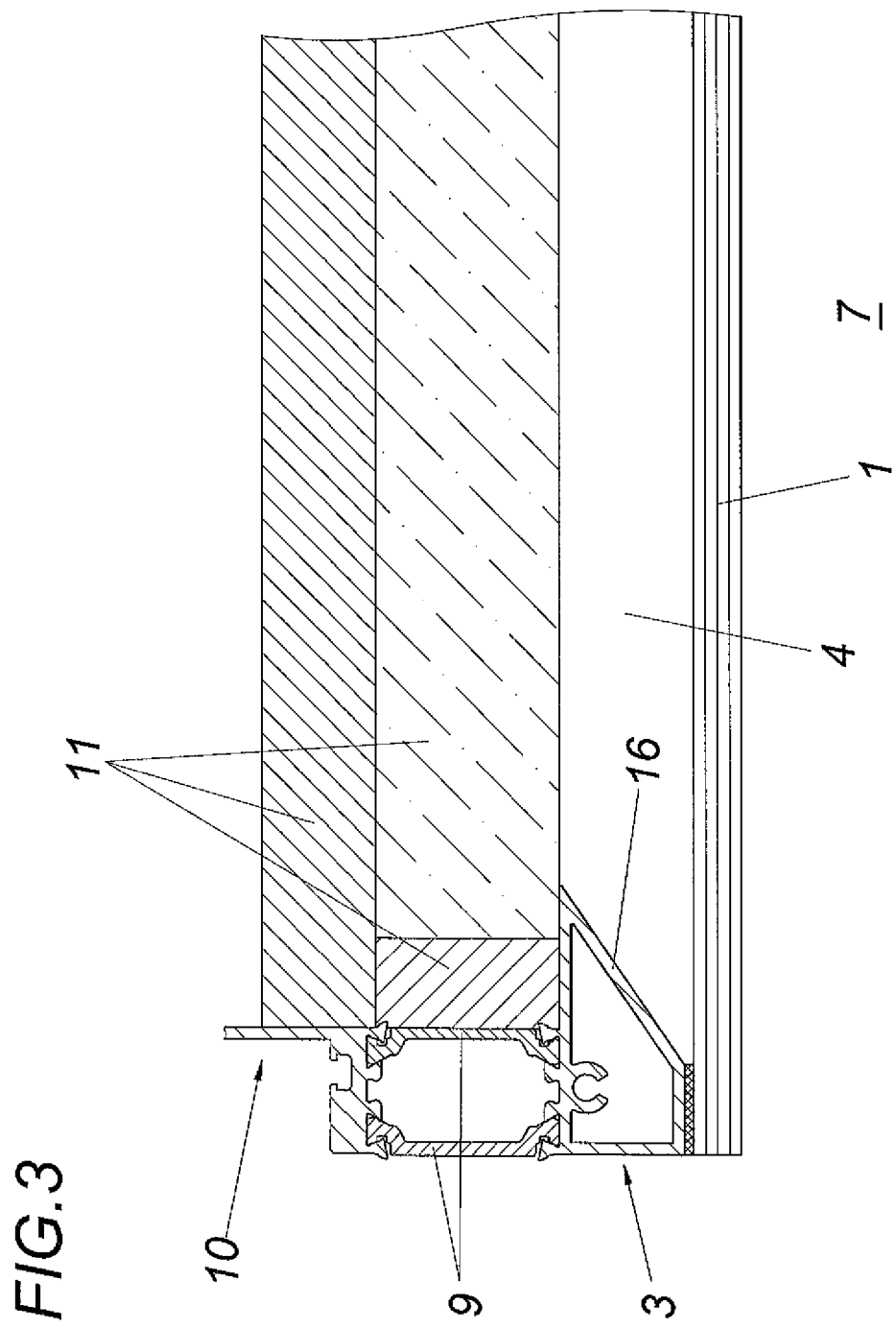
FIG. 3 shows the structural design of FIG. 2 in a sectional view along the line III-III.
Figure 4:
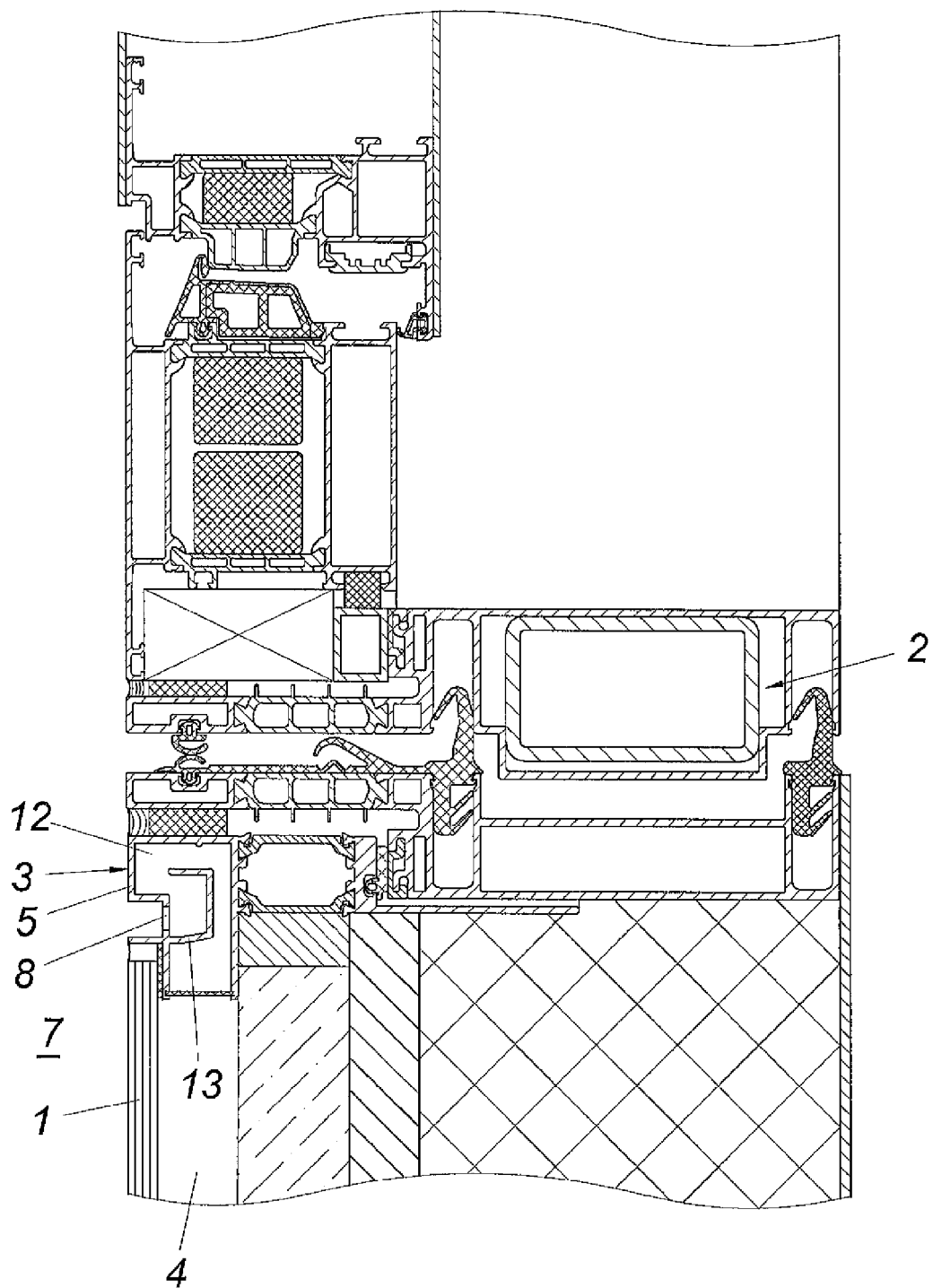
FIG. 4 shows a section of an installation situation of a cladding element in a cross-sectional view.
Figure 5:
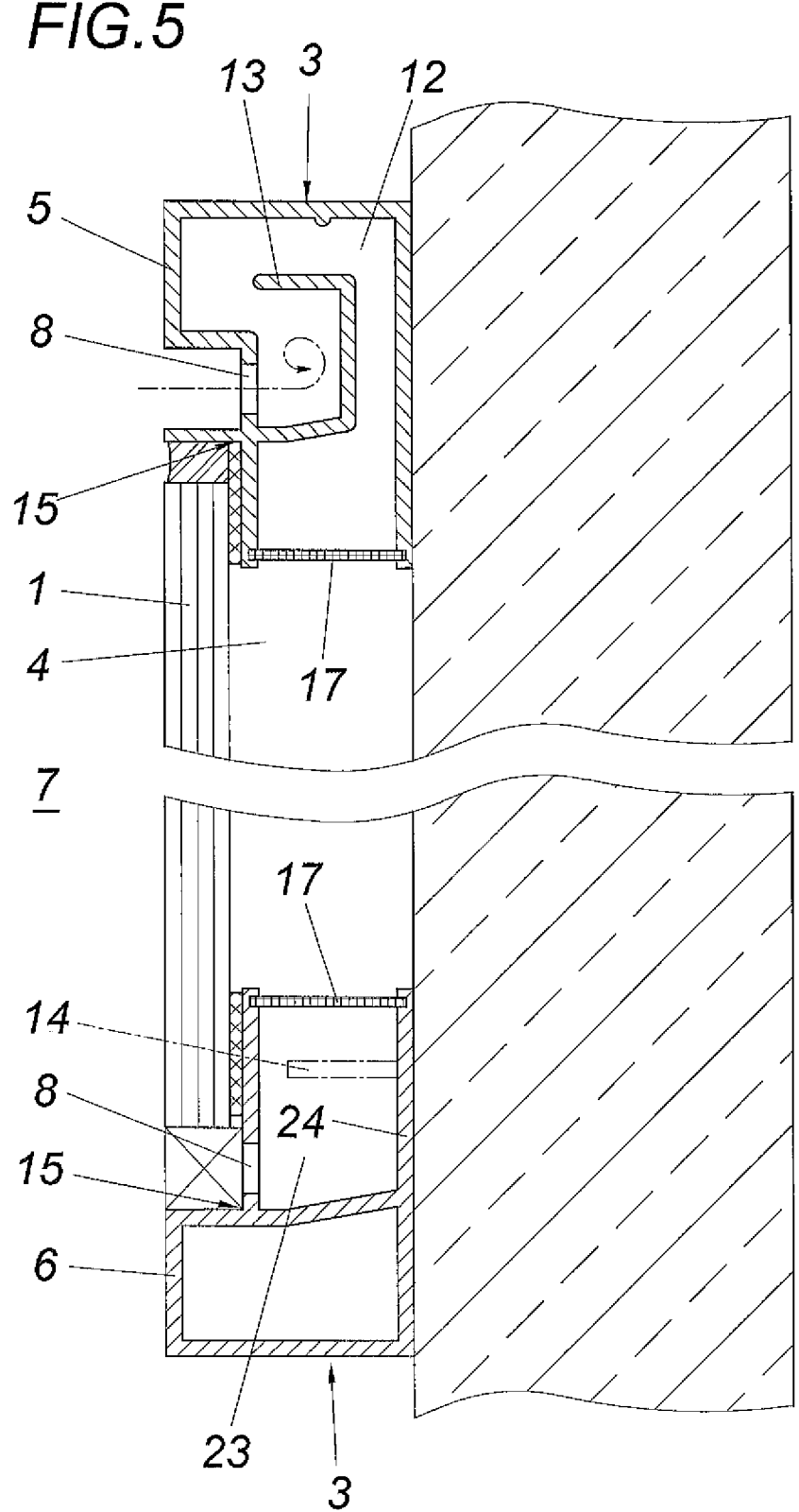
FIG. 5 shows a structural variant of the invention which is arranged directly on a building wall.

A structural design in accordance with the invention comprises at least one rear-ventilated cladding element 1, in particular a board, plate or a solar module, which can be suspended in front of a supporting framework 2 made of vertical support elements and horizontal bearing elements or a building wall. One frame 3 each is assigned to the cladding elements 1, which frame spans a rear-ventilation cross-section 4. Both the upper and the bottom frame leg profile 5, 6 of frame 3 comprise ventilation openings 8 opening towards the cladding front 7. The individual profiles of the frame 3 are attached to further profiles via insulating webs 9 in the illustrated embodiment, which further profiles can already be a part of the supporting framework 2 or still be part of the frame 3. In the illustrated embodiment according to FIG. 1 to FIG. 3, these profiles 10 are still parts of the frame 3, which in addition accommodates in its interior a substructure 11 consisting of various insulating materials such as active or passive solar elements. The profiles 10 must then be attached by suitable means to the supporting framework 2. If an increased fire protection effect of the construction is required, a metallic connecting profile 29 can be provided in addition to the insulating webs 9 or instead of the insulating webs 9 in order to attach the profiles of the frame 3 to the further profiles situated in a plane behind. The substructure 11 consists especially of components which are open to the diffusion of vapor.

In order to ensure proper rear ventilation in combination with sufficient protection against the penetration of splash water into the rear-ventilation cross-section 4, a splash guard 13 arranged in the manner of a labyrinth seal is assigned at least to the upper frame leg profile interior 12, which splash guard adjoins the frame leg profile 5 beneath the ventilation opening 8, which upwardly covers the ventilation openings 8 and which faces with its free end against the cladding front 7. Any fluid that may penetrate through the ventilation openings 8 will be caught by the splash guard 13, redirected in the longitudinal axis of the frame leg profile and be guided out of the frame leg profile 5 again via adjacent ventilation openings. As is shown especially in FIG. 2, this splash guard 13 is arranged in the manner of a C-profile directed against the cladding front 7.

A splash guard 14 in form of a web is assigned to the bottom frame leg profile interior 23, i.e. the interior of the bottom frame leg profile 6, which splash guard adjoins the frame leg profile rear wall 24 above the ventilation openings 8 and which faces with its free end against the cladding front 7.

The upper and the lower frame leg profiles 5, 6 respectively form a receiving fold 15 for the cladding elements 1. The upper and the lower frame leg profiles 5, 6 are combined together with the peripheral frame leg profile 16 (FIG. 3) to form a circumferentially enclosed frame 3. The rear walls 24 of the frame legs 5, 6, 16 lie in a common plane and, as is shown especially in FIG. 2, placed on a gas-tight but vapor-permeable substructure 11. This measure ensures that each cladding element 1 is rear-ventilated itself and there is no rear ventilation or ventilation by adjacent cladding elements. This is especially advantageous for improved fire protection because the individual cladding elements 1 are gas-decoupled among each other via their frames 3.

In addition, insect screens 17 which cover the ventilation cross-section 4 are assigned to the upper and lower frame leg profiles 5, 6 in the ventilation channel opening into the ventilation cross-section 4.

The invention claimed is:

1. A structural design comprising;
a rear-ventilated cladding element assigned to a frame comprising an upper frame leg profile and a lower frame leg profile, said upper and lower frame leg profile comprising an upper and a lower leg profile rear wall and ventilation openings leading to a front portion of the rear-ventilated cladding element;
wherein the rear-ventilated cladding element is hung in front of a supporting framework comprising vertical support elements and horizontal bearing elements,
wherein the frame spans a rear-ventilation cross-section, and
wherein an interior of the upper frame leg profile is assigned a first splash guard comprising a first labyrinth seal adjoining the frame leg profile below its respective ventilation opening and facing with a free end thereof towards the front of the rear-ventilated cladding element to cover said respective opening.

2. The structural design according to claim 1, wherein the first splash guard comprises a C-profile having an opening facing towards the front of the rear-ventilated cladding element.

3. The structural design according to claim 1, wherein a second splash guard is assigned to the lower frame leg profile interior, said second splash guard adjoining the lower frame leg profile rear wall above its respective ventilation opening, said second splash guard having a free end facing towards the front of the rear-ventilated cladding element.

4. The structural design according to claim 1, wherein the upper and the lower frame leg profile form a receiving fold for the rear-ventilated cladding element.

5. The structural design according to claim 1, further including insect screens covering ventilation channel cross-sections assigned to the upper and the lower frame leg profiles.

6. The structural design according to claim 1, wherein the upper and lower frame leg profile are jointly combined with a peripheral frame leg profile into a circumferentially enclosed frame.

7. The structural design according to claim 6, wherein the upper and lower rear walls and a rear wall of the peripheral frame leg profile are situated in a first common plane and the circumferentially enclosed frame is placed on a gas-tight but vapor-permeable substructure.

8. The structural design according to claim 1, wherein the rear-ventilated cladding element comprises at least one solar collector.

9. The structural design according to claim 1, wherein the upper and lower frame leg profiles of the frame are attached via insulating webs and/or at least one metallic connecting profile to a further profile situated in a rear plane.

* * * * *